March 23, 1926.
C. L. STANCLIFF
WELDING MACHINE
Filed May 17, 1923    3 Sheets-Sheet 1
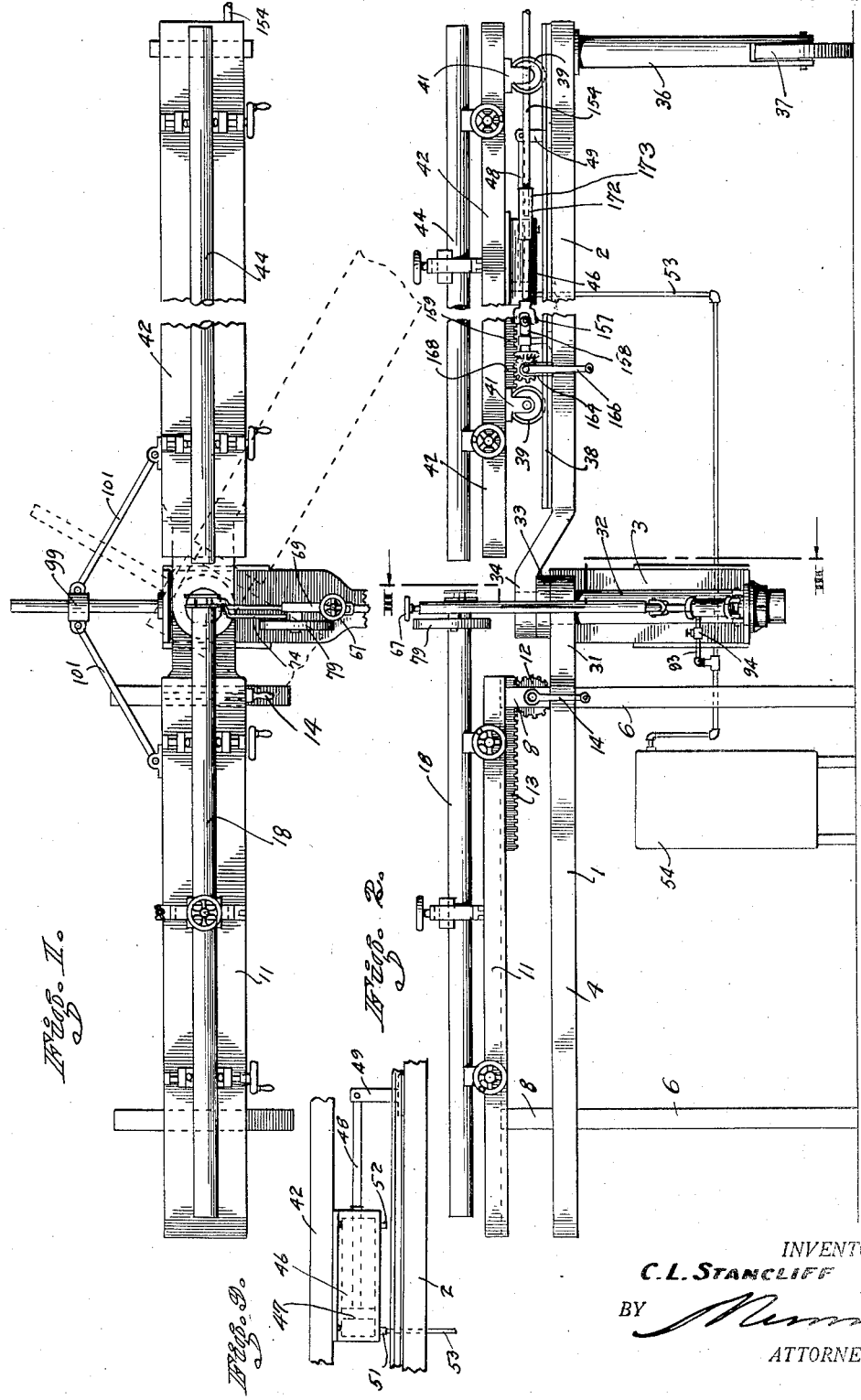
INVENTOR.
C. L. STANCLIFF
BY
ATTORNEYS.

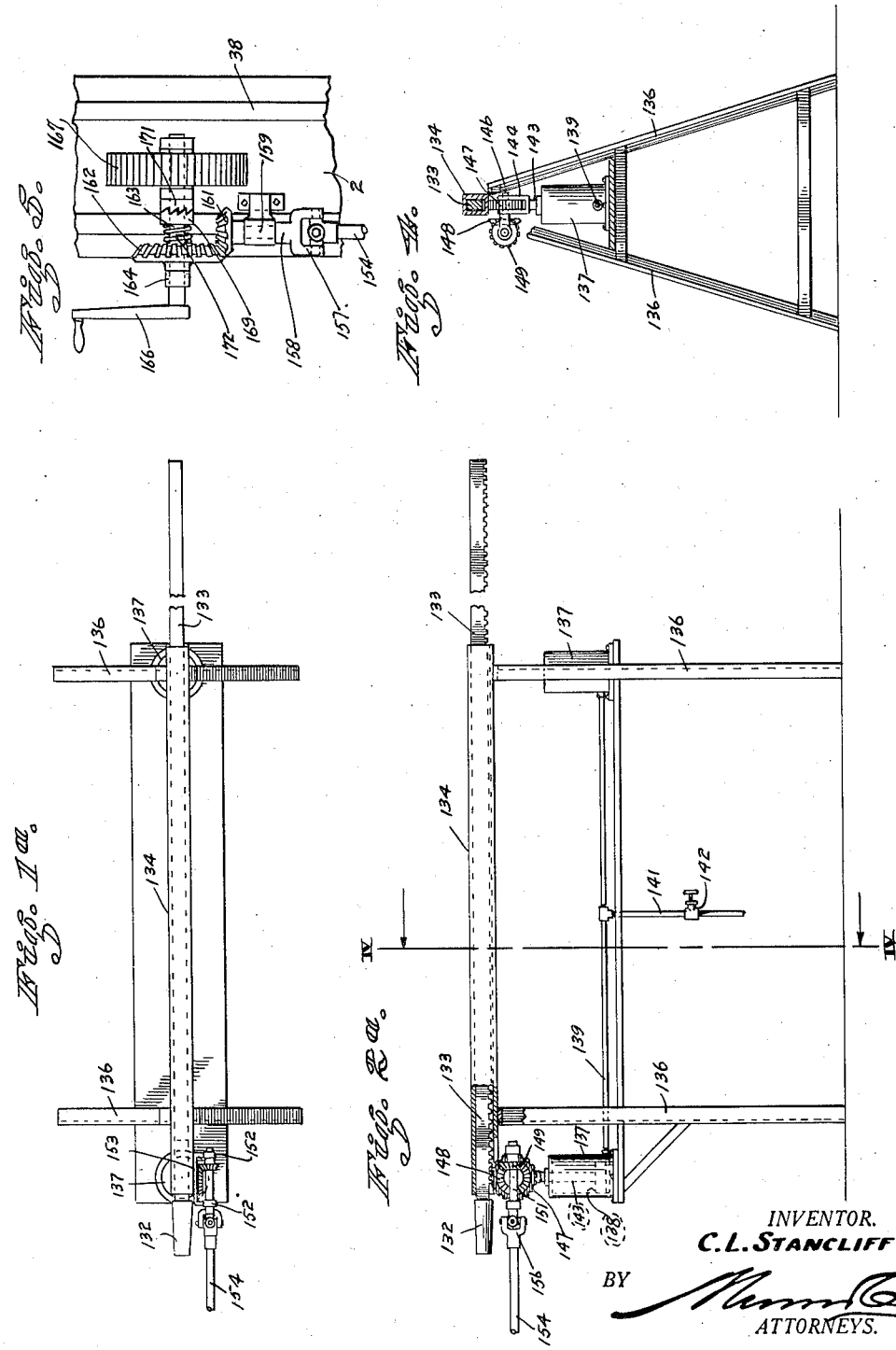

March 23, 1926.
C. L. STANCLIFF
1,577,818
WELDING MACHINE
Filed May 17, 1923   3 Sheets-Sheet 3
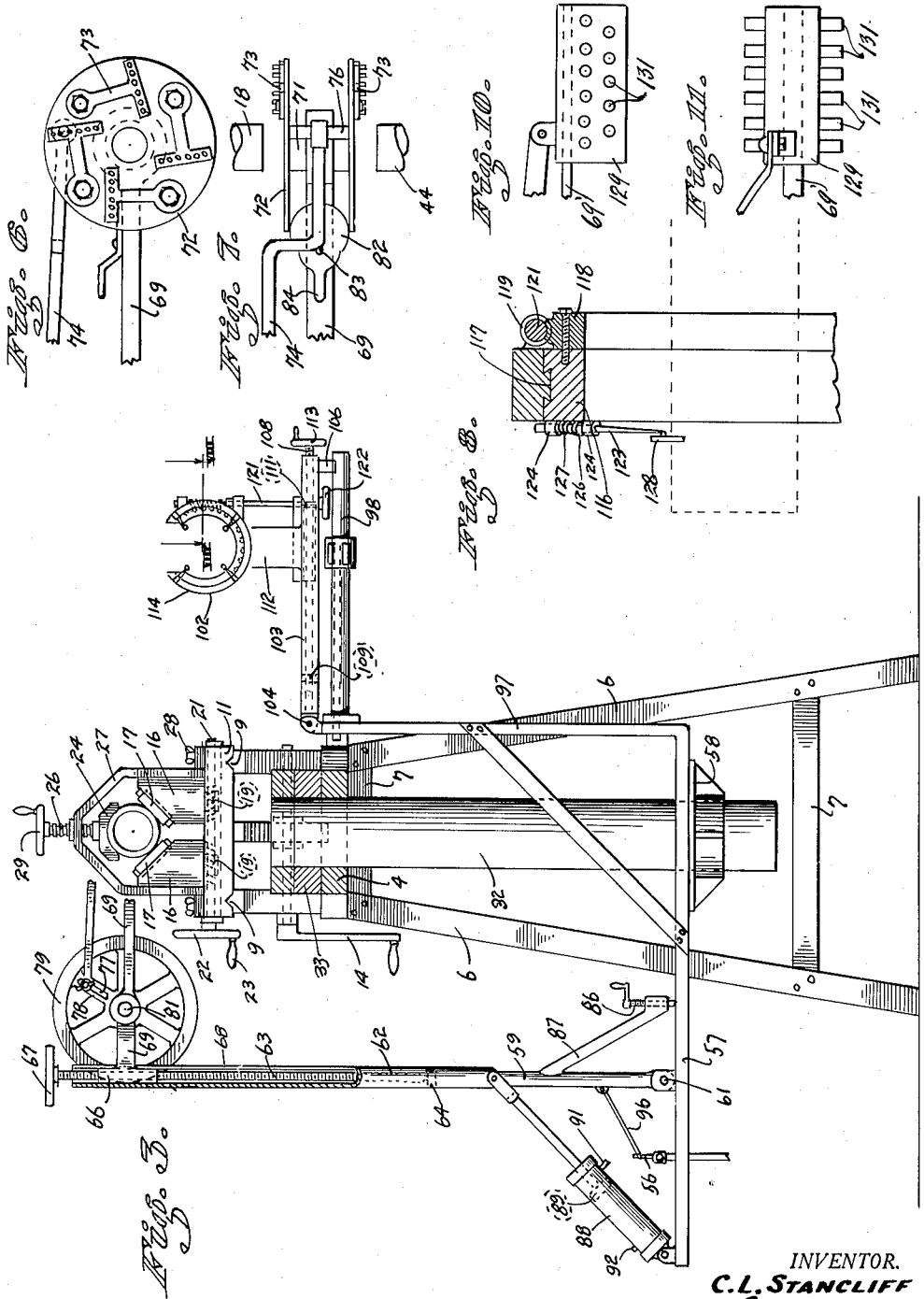
INVENTOR.
C.L. STANCLIFF
BY 
ATTORNEYS.

Patented Mar. 23, 1926.

1,577,818

UNITED STATES PATENT OFFICE.

CLIFTON L. STANCLIFF, OF BAKERSFIELD, CALIFORNIA.

WELDING MACHINE.

Application filed May 17, 1923. Serial No. 639,685.

*To all whom it may concern:*

Be it known that I, CLIFTON L. STANCLIFF, a citizen of the United States, and a resident of Bakersfield, county of Kern, and State of California, have invented a new and useful Welding Machine, of which the following is a specification.

The present invention relates to improvements in welding machines and its particular object is to provide a machine allowing two elements to be welded, to be supported in confronting relation, to be heated while thus supported by means of a torch arrangement interposed between the two elements, and to be forced upon one another immediately upon the withdrawal of the torch arrangement. One of the most essential features of this arrangement is to produce means allowing the operation of forcing the two elements upon one another to be carried out with sufficient speed after the withdrawal of the torch arrangement so as to prevent the cooling of the confronting faces. A further object of the invention is to render the supporting means adjustable so that the two elements may be arranged to meet at any desired angle and to provide means in conjunction therewith which allows the torch arrangement to be adjusted simultaneously so as to always occupy a transverse midway position between the two elements, no matter at what angle they meet. A further object of the invention is to provide a plunger and an operating mechanism for the same causing the plunger to be projected through one of the elements to be heated, if the same is a tube, into the joint to be welded whereby the forming of a burr on the inside of the joint is prevented. A further object of the invention is to provide an apparatus in conjunction with the welding machine which allows a metal element to be cut at any angle desired by the application of heat.

The preferred form of the invention is illustrated in the accompanying drawings in which Figures 1 and 1ª show a top plan view of my device; Figures 2 and 2ª a side view of the same; Figure 3 a vertical section taken along line III—III of Figure 2; Figure 4 a vertical section taken along line IV—IV of Figure 2ª; Figure 5 an enlarged detail view in plan of an actuating mechanism for the plunger previously mentioned; Figure 6 a detail view in side elevation of a torch arrangement for heating the elements to be welded; Figure 7 a plan view of the same; Figure 8 an enlarged sectional detail view taken along line VIII—VIII of Figure 3; Figure 9 an enlarged detail view of a mechanism adapted to plunge one of the tables supporting one of the elements forward; Figure 10 a detail view of a torch arrangement adapted to be used where flat bars of metal are to be welded; and Figure 11 a plan view of the latter device. While I have shown only the preferred form of the invention, it should be understood that various changes or modifications may be made within the scope of the claims hereto attached without departing from the spirit of the invention.

The principal parts of my device are a stationary table (1), a revolving table (2), and a revolving torch arrangment (3). The stationary table (1) consists of a plate (4) supported in any suitable manner on legs (6) secured to one another by means of horizontal braces (7). From the plate rise in spaced relation two pairs of standards (8), each standard terminating in a V shaped upper end (9) adapted to engage similarly shaped grooves of a plate (11) and to support the latter with freedom of longitudinally sliding motion. The latter motion may be imparted to the plate (11) by means of a gear wheel (12) supported in one pair of standards and engaging a rack (13) disposed on the lower face of the plate, a crank handle (14) allowing the operator to rotate the gear wheel (12). The upper plate (11) has a vise arrangement which may be described as follows: It supports on blocks (16) two pairs of rollers (17) adapted to form a pad for one of the elements to be welded which in this case is the tube (18). The blocks (16) are mounted on the plate (11) with freedom of sliding motion in a transverse direction so that their spacing may be changed. For the latter purpose the two blocks of each pair are provided with perforated downward projections (19) adapted to be threadedly engaged by a rod (21) which latter may be rotated by means of a hand wheel (22) and the handle (23) thereon. The threads engaging the two projections of one pair of blocks run in the opposite direction so that a rotary motion of the rod (21) will force the two blocks (16) either together or apart. This arrangement allows the position of the rollers (17) to be adjusted so that they may conveniently accommodate any size of pipe within the range of the machine. To hold the pipe, I provide a block (24) adapted to be lowered and raised by means of a threaded member (26) engaging a yoke (27) secured to the plate by means of studs and wing nuts (28). It will be seen that when the threaded member (26) is turned to the right by means of the hand wheel (29) the block (24) is forced upon the pipe and firmly holds the same in position.

The table (1) projects beyond its supporting frame to form an extension (31) which is perforated near its end and adapted to receive a vertical shaft (32) provided with a collar (33) adapted to rest on the extension (31). One end (34) of the second table (2) is pivoted to the upper end of the shaft (32) and rests on the collar (33). The other end of the table (2), which latter is disposed with its main portion in the same plane as the table (1), has a leg (36) extending downwardly therefrom, which latter leg is supported on a wheel (37) allowing the far end of the table (2) to be swung in either direction around the shaft (32). The table (2), previously referred to as the revolving table, has a track (38) thereon on which wheels (39) supporting through the bearings (41) a platform (42) are adapted to travel. The platform (42) has a vise arrangement thereon for supporting the pipe (44), which corresponds in every way to the vise arrangement described in connection with the plate (11). Normally the truck formed by the platform (42) and the wheels (39) is in the position indicated in Figure 2 with the pipe (44) disposed sufficiently far from the pipe (18) to allow of the introduction of the torch arrangement, to be described hereinafter. The truck may be pushed forward with great rapidity by means of the arrangement shown in detail in Figure 9, and comprising a cylinder (46) rigidly secured to the lower face of the platform (42) and a piston (47) adapted to reciprocate therein. The piston is connected by means of the rod (48) to a standard (49) rising from the table (2) which arrangement prevents the piston from moving. If compressed air is forced between the end of the cylinder and the piston the truck, therefore, has to move to the left. The intake (51) for the compressed air is provided at the left hand end of the cylinder while the exhaust (52) is near the right hand end but a certain distance away from the same so as to allow the air disposed rearwardly of the exhaust to form a cushion for the piston.

The intake for the cylinder connects with a tube (53) leading to a source of compressed air (54) and controlled by means of a suitable valve (56).

The third principal part of my device is the torch arrangement (3). The latter is supported on a platform (57) pivoted to the vertical shaft (32) and resting on a collar (58). A rod (59) is pivoted to this platform as shown at (61) and terminates at its upper end in a tubular member (62) into which extends a threaded rod (63) held against longitudinal motion by means of a collar (64). A sleeve (66) threadedly engages the rod, which latter may be turned by means of a hand wheel (67) and is adapted to be slid upwardly or downwardly by rotating the rod (63). The sleeve has an arm (69) extending therefrom passing through a slot (68) in the tubular member (62) and supporting at its end the torch arrangement shown in detail in Figures 6 and 7, and comprising a short shaft (71) having a disc (72) at either end. Each disc has pivoted at its outer face a plurality of torches (73) which may be of any suitable type, as for instance, acetylene torches. The discs may be set into oscillatory motion by means of the connecting rod (74) engaging at one end a transverse pin (76) connecting the two discs and at the other end a slot (77) in one of the spokes (78) of a wheel (79) supported on a short shaft (81) extending from the arm (69). When the face of one of the pipes is heated more intensely than the other face the operator may slide the torches away from the said pipe into closer proximity to the other pipe by means of the member (82) pivoted to the arm (69) as shown at (83). It will be noticed that when the operator turns the handle (84) of this member to the right the torches will be shifted to the left, while when the operator turns the handle to the left the torches will be shifted to the right.

Normally the support (59) for the torch arrangement is in a substantially vertical position as shown in Figure 3, and when thus disposed the torches are in their operative position, that is between the two confronting faces of the two members to be welded. The exact position desired, which changes somewhat with the size of the pipes to be welded, may be adjusted by means of the set screws (86) passing through a brace (87) extending downwardly from the rod (59) and lifting the brace from the platform (57) when turned far enough.

To quickly withdraw the torch arrangement from its operative position I use the arrangement shown in Figure 3 comprising a cylinder (88) having a piston (89) reciprocating therein and an inlet (91) for compressed air. An exhaust (92) near the other end of the cylinder allows the compressed air to leave the cylinder but is disposed a certain distance away from the end of the cylinder so as to allow of the formation of an air cushion. The intake (91) connects with the tube (93) which latter is controlled by means of a valve (94). It will thus be seen that when the valve (94) is opened the torch arrangement will be thrown out of its operative position immediately. At the same time a link (96) pivotally connecting the lower end of the rod (59) with the handle of the valve (56) operates the latter valve so as to open the same and since this valve, as previously stated, controls the supply of fluid in tube (53) communicating with the cylinder (46), it will be understood that the withdrawal of the torch arrangement is automatically followed by an immediate jumping forward of the truck (42).

It has been noted that the table (2) is adapted to revolve on the shaft (32). If two pipes of the character described are to be joined at an angle of ninety degrees, the table (2) can be swung around sufficiently far to form an angle of ninety degrees with the table (1). But the execution of this movement calls for a corresponding motion of the support for the torch arrangement, which latter to remain operative should be turned an angle of forty-five degrees. To cause a corresponding motion of the torch arrangement support I extend the platform (57) beyond the shaft (32), turn it upwardly as shown at (97) and upon reaching the elevation of the two tables terminates in a horizontal shaft (98) supporting a slide (99) connected by means of rods (101) to the two tables (1) and (2). Since the two rods (101) are of equal length the angle formed by the shaft (98) and the platform (57) with the two tables must always be equal so that the platform (57) always lies on the center line of the angle formed between the two tables.

A second torch arrangement (102) is supported on the opposite side of the two tables. A tubular member (103) is pivoted to the vertical extension (97) of the platform (57) as shown at (104) and provided with a projection (106) allowing its free end to rest on the shaft (98). A threaded rod (108) within the tube is held against endwise motion by means of a collar (109) and threadedly engages a sleeve (111) from which a standard (112) rises through a slot in the tube (103). The rod (108) may be rotated by means of a handwheel (113) which allows the standard to be positioned. The standard terminates in a mutilated ring (114) adapted to engage a pipe to be cut so as to surround the same when the tube (103) is swung on its pivot (104) into a vertical position. An internal mutilated ring (116) slidably engages the ring (114) by means of the dovetailed arrangement (117) shown in Figure 8 and the latter ring has a worm gear (118) fixed thereto, which latter is adapted to be rotated by means of the worm (119) on the shaft (121) adapted to be actuated by means of the handwheel (122). It will be seen that by oscillating the handwheel (122) the internal mutilated ring (116) can be oscillated so that a plurality of torches (123) extending inwardly from the ring (116) travel around the pipe so as to cut the same. Each torch is slidably supported in two perforated lugs (124) extending from the ring (116) with a collar (126) resting on the lower lug and a spring (127) exerting centerwise pressure on the collar (126). Near its end each torch (123) is provided with a wheel (128) adapted to ride on the pipe and to hold the end of the torch at a certain distance from the pipe.

A modified form of torch arrangement is shown in Figures 10 and 11. This torch arrangement is designed to be used where solid metal plates or similar shapes are to be welded. It differs from the welding torch arrangement previously described in so far that the arm (69') instead of supporting a disc element, as shown in Figures 6 and 7, has a rectangular block (129) slidable thereon, with torches (131) extending laterally therefrom in both directions. The member (74), used in Figure 6 for oscillating the discs (72) is used in a modified arrangement to push the block (129) back and forth. Otherwise the modified form does not distinguish from the form shown in Figures 6 and 7.

The operation of the device thus far described is as follows: If two pieces of pipe are to be welded, one of the pieces (18) is placed in the vise arrangement on the stationary table (1) in such a manner that its end to be welded extends to the center line of the shaft (32). The second piece (44) is then placed in the vise on the revolving table with its inner end in confronting relation to the inner end of the pipe (18). The torch arrangement shown in Figure 3 is then placed so that the torches (73) secured to the discs (72) confront the two ends of the pipes to be welded. The torches are then lit and the wheel (79) is rotated, which causes the discs (72) to oscillate so that the end faces of the two pipes are heated evenly. If the operator should notice that one pipe is getting hotter than the other one he may shift the discs (72) by means of the member (82) so as to bring the torch arrangement closer to the other pipe. After the pipes have reached the temperature necessary for the welding operation, the operator opens the valve (94) which allows air to enter into the cylinder (88) through the intake (91) so as to push the piston (89) downwardly and to withdraw the torch arrangement. During this operation the link (96) secured to the rod (59) opens the valve (56), which allows air to enter the cylinder (46) through the intake (51). Since the piston (47) within the cylinder is stationary, the cylinder is forced to the left and takes the truck (42) along with it so as to force the pipe (44) in operative contact with the pipe (18), which completes the welding operation. It should be remembered that the main object of the invention is to secure immediate action for the advancing of the pipe (44) upon the withdrawal of the torch arrangement, and it will be readily seen that this immediate action is secured in the present invention through the fact that the torch arrangement during its withdrawal operates the valve, which starts the advancing operation for the pipe (44).

If it is desired to weld two pipes which are cut at an angle, the first pipe is secured in the vise arrangement of the stationary table so that the vertical center line of its end face is the same as the center line of the shaft (32). The other pipe is secured in the vise arrangement on the revolving table and the latter table is revolved on its hinge, that is, the shaft (32), until the two end faces to be welded are parallel. The revolving of the second table also causes the torch arrangement to revolve so that the latter always occupies a central position relative to the two tables. The torch arrangement may now be adjusted so as to face the two ends of the two pipes to be welded and heat may then be applied. After the heat rises to a desired point the valve (94) is opened which causes the withdrawal of the torch arrangement and immediately thereafter the advancing of the truck on the revolving table, which pushes the second pipe in operative contact with the first pipe, whereby the welding operation is completed. The substitution of a solid plate for the pipe does not in any way affect the operation, except that preferably the torch arrangement shown in Figures 10 and 11 is used.

To cut a pipe the torch arrangement shown on the right hand side of Figure 3 is used, that is the pipe is secured in its place on the stationary table, and if desired on the revolving table. The torch arrangement is swung in place so that the wheels (128) ride on the pipe. The torches are then lit, the handwheel (122) rotated back and forth whereby the torch arrangement is slowly oscillated so as to burn through the pipe, and to thereby cut the same.

If it is desired to cut the pipe at an angle the revolving table is revolved on the shaft (32) until the torch arrangement reaches the desired angle whereupon the operation may be performed.

If it should become necessary to provide means preventing the formation of a burr at the joint, the device shown in Figures 1ª and 2ª may be used. It comprises a plunger (132) at the end of a rack bar (133) slidably supported in a guide member (134). The latter is normally supported on two frames (136) at an elevation lower than the pipe (44) when the latter is in place so as to not interfere with the proper placing of the pipe (44). The guide member (134) is adapted to be lifted by means of the two cylinders (137) having pistons (138) reciprocating therein, which latter pistons are adapted to be raised by means of compressed air admitted through the tubes (139) and (141) controlled by the valve (142). The rod (143) extending from the piston (138) is forked as shown at (144), Figure 4, and supports on a pin (146) a gear wheel (147) meshing with the rack rod (133) for advancing the same. The pin (146) also supports a beveled gear (148) meshing with a beveled gear (149) on a longitudinal shaft (151) supported in bearings (152) in the arms of a U shaped member (153) supported on the pin (146). The shaft (151) connects with a long shaft (154) through a universal joint (156), and the latter shaft extends forwardly and connects through a second universal joint (157) with a short shaft (158) supported in a bearing (159). The short shaft terminates in a beveled gear (161), see Figure 5, meshing with a beveled gear (162) supported on the shaft (163) supported on the standard (164).

The shaft (163) may be rotated by means of a handle (166). It will be noted that if the shaft (163) is rotated counter-clockwise it will rotate the shaft (158) clockwise as viewed from the left hand side of Figure 5, and the shaft (154) and (151) in the same direction with the result that the bevel gear (149) turns the bevel gear (148) counter-clockwise and through the action of the gear wheel (147) advances the rack rod (133) having the plunger (132) secured thereto. After the two pipes (18) and (44) have been positioned the guide member (134) is raised by opening the valve (142) and allowing compressed air to enter into the cylinders (137) below the piston (138). After perfect axial alinement of the plunger (132) and the pipe (44) has been obtained, the handle (166) is rotated counter-clockwise, which pushes the plunger (132) forward into the pipe (44). This operation is continued until the plunger nearly reaches the inner end of the pipe (44).

The shaft (163) as shown in Figure 5 has a gear wheel (167) loosely supported thereon, which gear wheel meshes with a rack (168) secured to the lower face of the platform (42). Two ratchets (169) and (171), the former one of which is carried on the shaft (163), while the latter is fixed to the gear (166), engage one another in such a manner that when the shaft (163) is turned counter-clockwise by means of the handle the gear wheel (166) is not affected because a spring (172) allows the ratchet (169) to become disengaged from the other ratchet.

When, however, the gear wheel (166) is turned counter-clockwise the ratchet (171) engages the ratchet (169) and causes the same to rotate in the same manner and the same direction as if it were manipulated by the handle (166). When the platform (42) or the truck supporting the same plunges forward for the purpose of throwing the pipe (44) in operative contact with the pipe (18), the gear wheel (166) is turned counter-clockwise by the rack (168) and turning the shaft (163) and through the same the longitudinal shafts (158), (154) and (151), causes the plunger (132) to advance into the joint between the two pipes thereby preventing the forming of a burr. The gear ratio of this transmission should be such that the plunger advances at about twice the speed of the truck carrying the pipe (44), since the truck itself moves and the plunger has to move faster to reach the joint in time to assist in the welding operation.

Since the plunger, as at present designed, could not be used when two pipes are to be joined at an angle, it has to be disconnected for the latter operation, and for this purpose is broken as shown at (172) with a sleeve (173) adapted to be pushed over the break in the shaft. Where the sleeve engages the shaft the latter, of course, should be angular in cross section.

I claim:

1. In a welding machine, means for supporting two elements to be welded in confronting relation, means for heating confronting faces of the elements having means associated therewith for rendering the same inactive and means for forcing one of the heated faces upon the other in timed relation to the ceasing of the action of the heating means.

2. In a welding machine, means for supporting two elements to be welded in confronting relation, means for heating confronting faces of the elements having means associated therewith for rendering the same inactive and means for forcing one of the heated faces upon the other in timed relation to the ceasing of the action of the heating means, the latter means being actuated by the means for rendering the heating means inactive.

3. In a welding machine, means for supporting two elements to be welded in confronting relation, means for heating confronting faces of the elements having means associated therewith for withdrawing the same and means for forcing one of the heated faces upon the other in timed relation to the withdrawal of the heating means.

4. In a welding machine, means for supporting two elements to be welded in confronting relation, means for heating confronting faces of the elements having means associated therewith for withdrawing the same and means for forcing one of the heated faces upon the other adapted to be actuated by the withdrawal of the heating means.

5. In a welding machine, means for supporting two elements to be welded in confronting relation, means for heating confronting faces of the elements having means associated therewith for withdrawing the same, means for forcing one of the heated faces upon the other and control means for the latter means adapted to be actuated by the withdrawal of the heating means.

6. In a welding machine, means for welding two elements cut to engage one another at an angle, comprising means for supporting one of the elements, means for supporting the second element in confronting relation having means associated therewith for swinging the same into an operative angular position, means for heating confronting faces of the elements having means connected therewith for simultaneously swinging the same into an intermediate angular position, and means for forcing one of the elements upon the other.

7. In a welding machine, means for welding two elements cut to engage one another at angle, comprising means for supporting one of the elements, means for supporting the second element in confronting relation having means associated therewith for swinging the same into an operative angular position, means for heating confronting faces of the elements having means connected therewith for simultaneously swinging the same into an intermediate angular position, means for rendering the heating means inactive and means for forcing one of the elements upon the other in timed relation thereto.

8. In a welding machine, means for welding two elements cut to engage one another at an angle, comprising means for supporting one of the elements, means for supporting the second element in confronting relation having means associated therewith for swinging the same into an operative angular position, means for heating confronting faces of the elements having means connected therewith for simultaneously swinging the same into an intermediate angular position, means for withdrawing the heating means and means automatically controlled by the withdrawal means for forcing one of the elements upon the other in timed relation to the withdrawal.

9. Positioning means for two elements to be welded having angular faces, comprising means for supporting one of the elements, means for supporting the second element in confronting relation to and in alinement with the first element, means for swinging the second element on the vertical centerline of the confronting face of the first element whereby the confronting faces are made parallel and means for forcing the latter element upon the former.

10. Positioning means for two elements to be welded comprising means for supporting one of the elements, means for supporting the second element in confronting relation to the first element and means for imparting longitudinal motion to the latter element whereby the same is forced upon the former element, comprising two members forming a pressure chamber, a stationary support for one of the members, an operative connection between the other member and the second element and means for introducing a pressure medium into the pressure chamber.

11. In a welding machine of the character described, means for supporting two elements to be welded in spaced and confronting relation, a standard pivotally supported in operative proximity thereto having an arm extending therefrom, a torch arrangement on said arm and pressure means engaging the standard adapted to introduce the torch arrangement between the confronting faces of the two elements.

12. In a welding machine of the character described, means for supporting two elements to be welded in an angular plane in spaced and alined relation, a torch arrangement having means associated therewith for supporting the same between the elements, means for swinging one of the elements whereby its face is made parallel with the face of the other element and means for simultaneously swinging the torch arrangement into a position parallel to both faces.

13. In a welding machine of the character described, means for supporting two elements to be welded in an angular plane in spaced and alined relation, a torch arrangement having means associated therewith for supporting the same between the elements, means for swinging one of the elements whereby its face is made parallel with the face of the other element and means for simultaneously swinging the torch arrangement into a position parallel to both faces, comprising a bar associated with the torch arrangement having a slide thereon, and arms of equal length associated with both elements pivotally engaging the slide.

14. In a welding machine of the character described, means for supporting two elements to be welded in confronting relation and means for forcing one element upon the other for welding purposes, comprising two members forming a pressure chamber, a stationary support for one of the members, an operative connection between the second member and the said element and means for introducing a pressure medium into the pressure chamber.

15. In a welding machine of the character described, means for supporting two elements to be welded in confronting relation, a plunger supported in operative relation to one of the elements, means for forcing the latter element upon the other element for welding purposes and means for simultaneously advancing the plunger into the joint between the two elements.

16. In a welding machine of the character described, means for supporting two elements to be welded in confronting relation, a plunger supported in operative relation to one of the elements, means for forcing the latter element upon the other element for welding purposes and means for simultaneously advancing the plunger into the joint between the two elements, comprising an operative connection between the movable element and the plunger whereby the motion of the former is transmitted to the latter.

17. In a welding machine of the character described, means for supporting two elements to be welded in confronting relation, a plunger supported rearwardly of one of the elements below the horizontal plane of the same, means for raising the plunger into the plane of the said element, means for introducing the plunger into the element, means for forcing the element upon the other element for welding purposes and means for simultaneously advancing the plunger into the joint between the two elements.

18. In a welding machine of the character described, means for supporting two elements to be welded in confronting relation, a plunger supported rearwardly of one of the elements below the horizontal plane of the same, means for raising the plunger into the plane of the said element, means for introducing the plunger into the element, means for forcing the element upon the other element for welding purposes and means for simultaneously advancing the plunger into the joint between the two elements, comprising an operative connection between the movable element and the plunger whereby the motion of the former is transmitted to the latter.

CLIFTON L. STANCLIFF.